United States Patent
Ogawa

(10) Patent No.: US 8,503,067 B2
(45) Date of Patent: Aug. 6, 2013

(54) DISPLAY SHEET, DISPLAY DEVICE, AND ELECTRONIC APPARATUS

(75) Inventor: Satoshi Ogawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/238,758

(22) Filed: Sep. 21, 2011

(65) Prior Publication Data

US 2012/0105941 A1    May 3, 2012

(30) Foreign Application Priority Data

Oct. 28, 2010   (JP) ................................. 2010-242242

(51) Int. Cl.
*G02B 26/00*   (2006.01)

(52) U.S. Cl.
USPC .......................................... 359/296; 359/290

(58) Field of Classification Search
USPC ................................................ 359/290–296
See application file for complete search history.

(56) References Cited

U.S. PATENT DOCUMENTS

| | | | |
|---|---|---|---|
| 6,113,810 A | 9/2000 | Hou et al. | |
| 6,844,958 B2 | 1/2005 | Kawai | |
| 7,499,211 B2 | 3/2009 | Suwabe et al. | |
| 7,656,576 B2 | 2/2010 | Suwabe et al. | |
| 2003/0086149 A1 | 5/2003 | Kawai | |
| 2008/0112040 A1* | 5/2008 | Suwabe et al. | ............... 359/296 |

FOREIGN PATENT DOCUMENTS

| | | |
|---|---|---|
| JP | A-08-510790 | 11/1996 |
| JP | A-2003-140202 | 5/2003 |
| JP | A-2006-71909 | 3/2006 |
| JP | A-2007-192880 | 8/2007 |
| JP | A-2008-139803 | 6/2008 |
| JP | A-2008-181058 | 8/2008 |
| JP | A-2008-216321 | 9/2008 |
| JP | A-2010-044114 | 2/2010 |
| WO | WO 94/28202 A1 | 12/1994 |

* cited by examiner

*Primary Examiner* — Mahidere Sahle
(74) *Attorney, Agent, or Firm* — Oliff & Berridge, PLC

(57) ABSTRACT

A display device includes a substrate that is provided on a display face side, an opposed substrate that is provided opposing the substrate, a display layer that is provided between the substrate and the opposed substrate and is filled with a dispersion liquid in which white particles and black particles are dispersed in a dispersion medium, and a particle constrained layer that is provided in the display layer to allow the particles to move in a thickness direction of the display layer and to prevent the particles from moving in an in-plane direction of the display layer. A void ratio of the particle constrained layer of the substrate side is higher than that of the opposed substrate side.

13 Claims, 12 Drawing Sheets

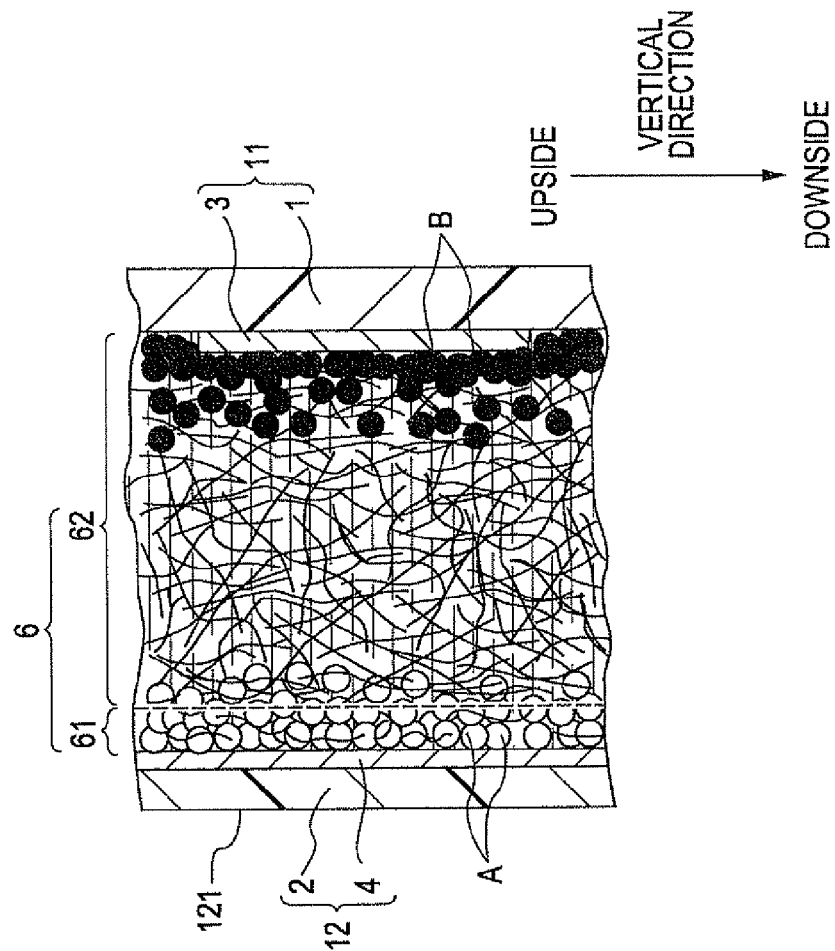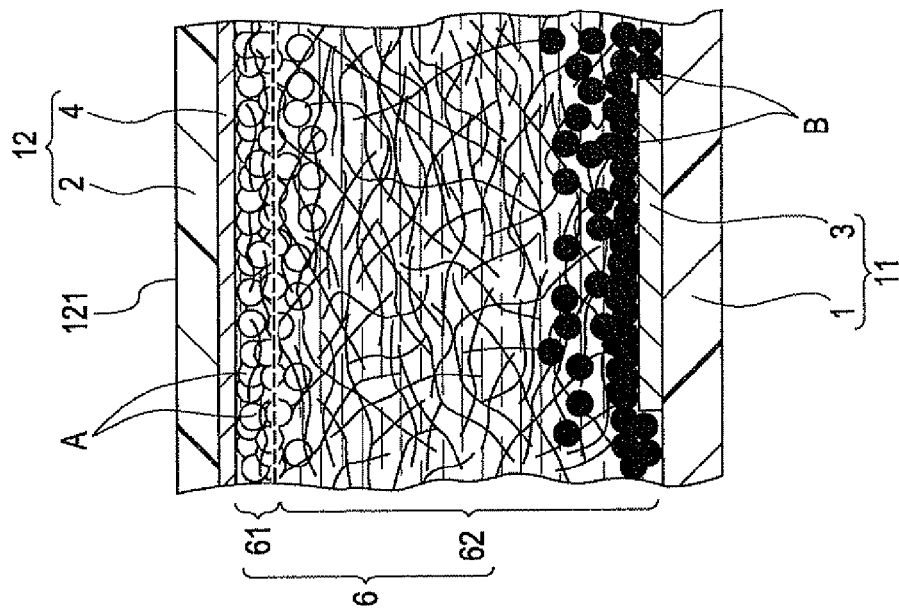

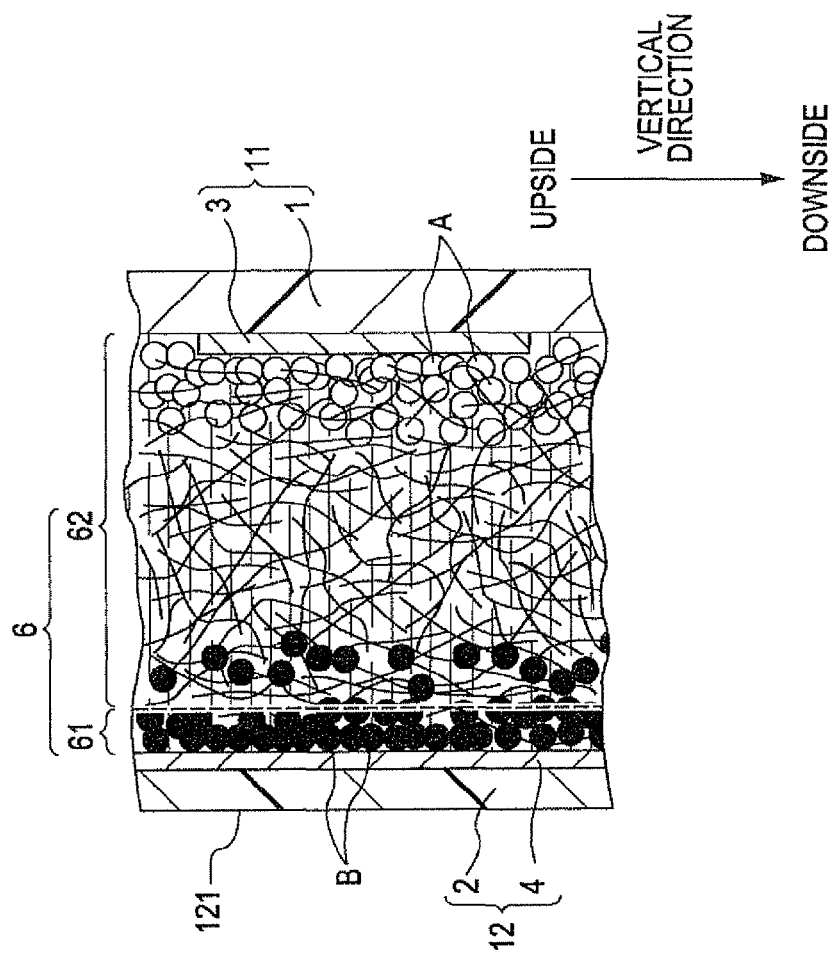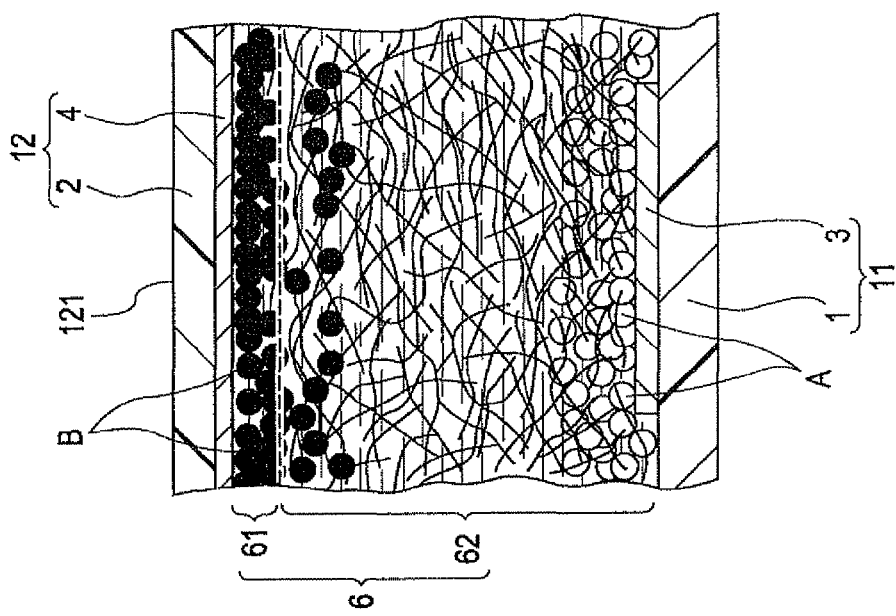

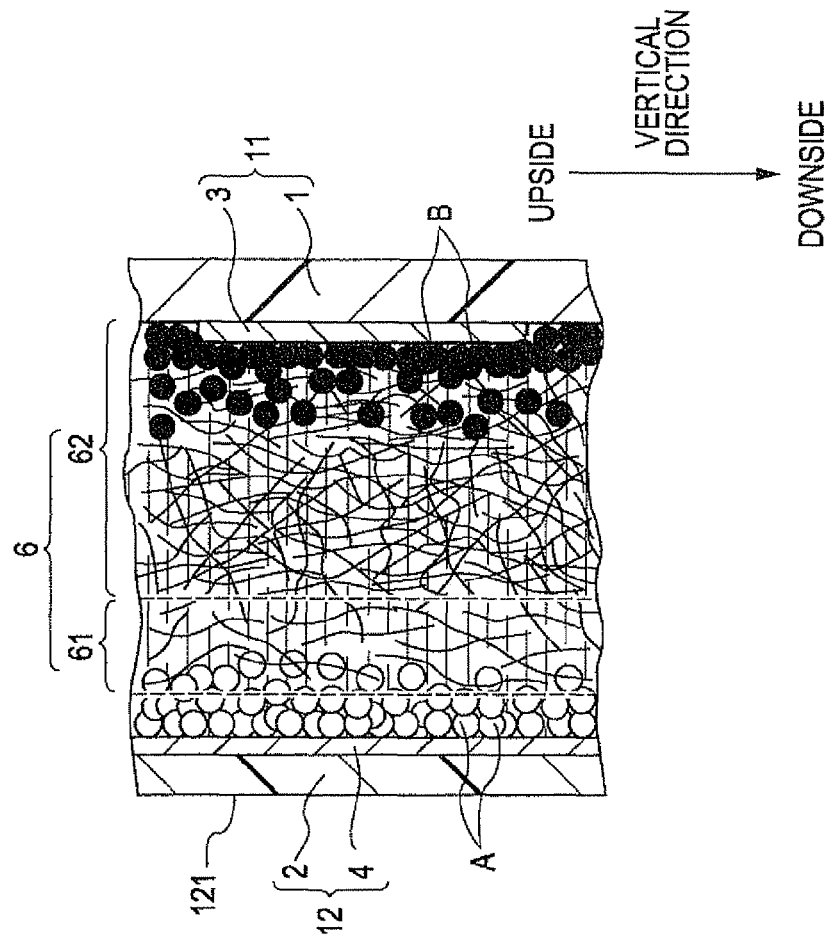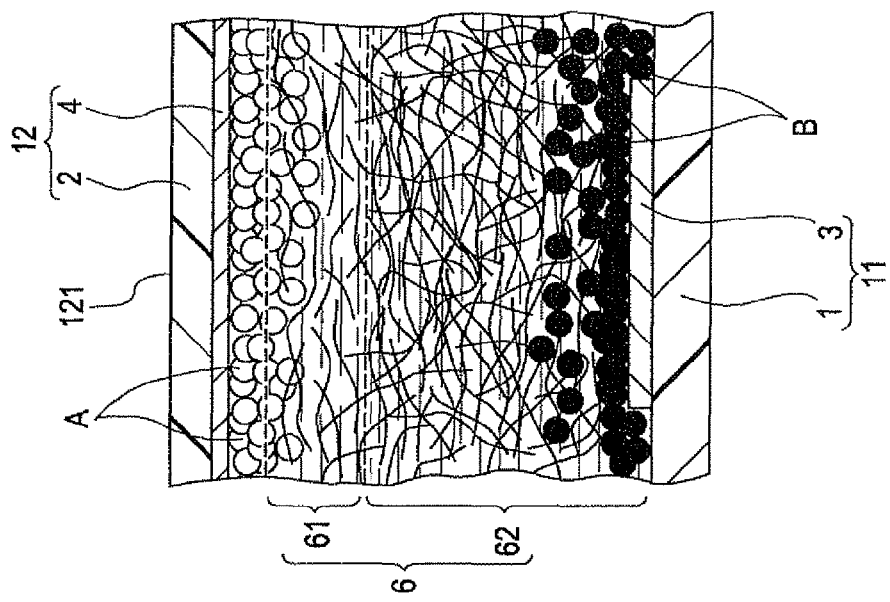

DISPLAY SHEET, DISPLAY DEVICE, AND ELECTRONIC APPARATUS

BACKGROUND

1. Technical Field

The present invention relates to a display sheet, a display device, and an electronic apparatus.

2. Related Art

For example, an electrophoretic display using electrophoresis of particles, which constitutes an image display unit of an electronic paper is known (e.g., see JP-A-2010-44114). The electrophoretic display has excellent portability and a power saving property, and is particularly suitable as the image display unit of the electronic paper.

The electrophoretic display includes a pair of electrodes provided opposing each other, and a display layer interposed therebetween. The display layer is filled with a dispersion liquid in which positively charged white particles and negatively charged black particles are dispersed in a liquid dispersion medium. In such an electrophoretic display, voltage is applied between the pair of electrodes to electrophorese the white particles and the black particles in a desired direction, thereby displaying a desired image.

The configuration of the display layer is mainly classified into a "partition type" in which the display layer is divided into a plurality of cells by partitions as described in JP-A-2010-44114, a "microcapsule type" in which a plurality of microcapsules in which a dispersion liquid is sealed are arranged and fixed by a binder as described in JP-A-2003-140202, and a "liquid crystal type" in which a display layer as one space (i.e., is not divided by partitions or the like) is filled with a dispersion liquid in the space as described in JP-T-8-510790.

However, in the "partition type", there is a problem that an effective display area (an area where a display color is changeable) in a display face is reduced by the partitions, and particularly, display characteristics are decreased. In the "microcapsule type", there is a problem that a gap occurs between microcapsules adjacent to each other, an effective display area in a display face is reduced, display characteristics are decreased, and leakage current is generated by the binder when applying the voltage between the pair of electrodes, thereby deteriorating the display characteristics. In the "liquid crystal type", almost the whole area in the display face can be used as an effective display area, but there is a problem in that the white particles and the black particles move (precipitate) down in the vertical direction by gravity, for example, when the display is used as a book, the display image is not kept, and reliability decreases.

SUMMARY

An advantage of some aspects of the invention is to provide a display sheet with high reliability and excellent display characteristics, a display device including the same, and an electronic apparatus with high reliability.

According to an aspect of the invention, there is provided a display sheet including a first substrate that is provided on a display face side; a second substrate that is provided opposing the first substrate; a display layer that is provided between the first substrate and the second substrate, and is filled with a dispersion liquid in which at least one kind of positively or negatively charged particles are dispersed in a dispersion medium; and a particle constrained layer that is provided in the display layer, wherein a void ratio of the first substrate side of the particle constrained layer is higher than that of the second substrate side, on the first substrate side.

With such a configuration, it is possible to provide the display sheet with high reliability and excellent display characteristics.

In the display sheet according to the aspect of the invention, it is preferable that the particle constrained layer has a first particle constrained layer provided on the first substrate side and a second particle constrained layer provided closer to the second substrate side than the first particle constrained layer, and the void ratio of the first particle constrained layer is higher than that of the second particle constrained layer.

With such a configuration, the configuration of the particle constrained layer is simple.

According to another aspect of the invention there is provided a display sheet including a first substrate that is provided on a display face side; a second substrate that is provided opposing the first substrate; a display layer that is provided between the first substrate and the second substrate, and is filled with a dispersion liquid in which at least one kind of positively or negatively charged particles are dispersed in a dispersion medium; and a particle constrained layer that is provided in the display layer, wherein the particle constrained layer has a first particle constrained layer provided on the first substrate side and a second particle constrained layer provided closer to the second substrate side than the first particle constrained layer, and wherein the void ratio of the first particle constrained layer is higher than that of the second particle constrained layer.

With such a configuration, it is possible to provide the display sheet with high reliability and excellent display characteristics.

In the display sheet according to the aspect of the invention, it is possible that the particle constrained layer allows the particles to move in a thickness direction of the display layer and prevents the particles from moving in an in-plain direction of the display layer.

With such a configuration, it is possible to exhibit superior display characteristics.

In the display sheet according to the aspect of the invention, it is preferable that the void ratio of the first particle constrained layer is equal to or more than 70% and equal to or less than 99%, and the void ratio of the second particle constrained layer is equal to or more than 50% and equal to or less than 90%.

With such a configuration, it is possible to smoothly move the particles in the thickness direction of the display layer and to prevent the particles from moving in the in-plane direction of the display layer, in the first particle constrained layer. In addition, it is possible to make the first particle constrained layer not stand out as viewed from the display face.

In the display sheet according to the aspect of the invention, it is preferable that a value of H1/H2 is equal to or more than 0.1 and equal to less than 0.5 where a thickness of the first particle constrained layer is H1 and a thickness of the second particle constrained layer is H2.

With such a configuration, it is possible to sufficiently raise the ratio of the particle constrained layer occupied in the display layer. Since a constraint property of the particles of the second particle constrained layer is higher than that of the first particle constrained layer between the first particle constrained layer and the second particle constrained layer, it is possible to more effectively prevent or suppress movement (precipitation) of the particles downward in a vertical direction when erecting the display sheet, by raising the ratio of the second particle constrained layer. In addition, since the thickness of the first particle constrained layer can be made into a thickness in which the second particle constrained layer does not stand out from the display face, it is possible to prevent the display characteristics from deteriorating.

In the display sheet according to the aspect of the invention, it is preferable that the first particle constrained layer is separated from the first substrate, and the separation distance between the first particle constrained layer and the first substrate is equal to or more than 0.5 times and equal to or less than 5 times an average particle diameter of the particles.

With such a configuration, it is possible to make the particle constrained layer stand out less as viewed from the display face side.

In the display sheet according to the aspect of the invention, it is preferable that the particle constrained layer further includes a third particle constrained layer that is provided closer to the second substrate side than the second particle constrained layer, and a void ratio of the third particle constrained layer is higher than that of the second particle constrained layer.

With such a configuration, it is possible to move the particles in the in-plain direction of the display layer on the second substrate side. For this reason, for example, when a strong impact is applied to the device or the device is left in the same posture for a long time causing deflection of the particles, it is easy to uniformly disperse the particles in the display layer again.

In the display sheet according to the aspect of the invention, it is preferable that the void ratio of the third particle constrained layer is equal to or more than 70% and equal to or less than 99%.

With such a configuration, it is easier to uniformly disperse the particles in the display layer.

In the display sheet according to the aspect of the invention, it is preferable that the particle constrained layer has at least one of a porous body and an aggregate of fibers.

With such a configuration, the configuration of the particle constrained layer is simple.

In the display sheet according to the aspect of the invention, the dispersion liquid includes positively or negatively charged first particles, and second particles charged having polarity reverse to that of the first particles, and average particle diameters of the first particles and the second particles are substantially the same.

With such a configuration, since it is possible to obtain the same effect with respect to any particles of the first and second particles, the display characteristics are further improved.

According to still another aspect of the invention, there is provided a display device including the display sheet according to the aspect of the invention.

With such a configuration, it is possible to obtain the display device with high reliability.

According to still another aspect of the invention, there is provided an electronic apparatus including the display device according to the aspect of the invention.

With such a configuration, it is possible to obtain the electronic apparatus with high reliability.

BRIEF DESCRIPTION OF THE DRAWINGS

The invention will be described with reference to the accompanying drawings, wherein like numbers reference like elements.

FIG. 4A and FIG. 4B are cross-sectional views illustrating an operation and an effect of the display device shown in FIG. 1.

FIG. 5A and FIG. 5B are cross-sectional views illustrating an operation and an effect of the display device shown in FIG. 1.

FIG. 7A and FIG. 7B are cross-sectional views illustrating an operation and an effect of the display device shown in FIG. 6.

DESCRIPTION OF EXEMPLARY EMBODIMENTS

Hereinafter, a display sheet, a display device, and an electronic apparatus of preferred embodiments of the invention will be described in detail with reference to the accompanying drawings.

1. Display Device

First, a display device provided with a display sheet of the invention will be described.

First Embodiment

Figure 1:
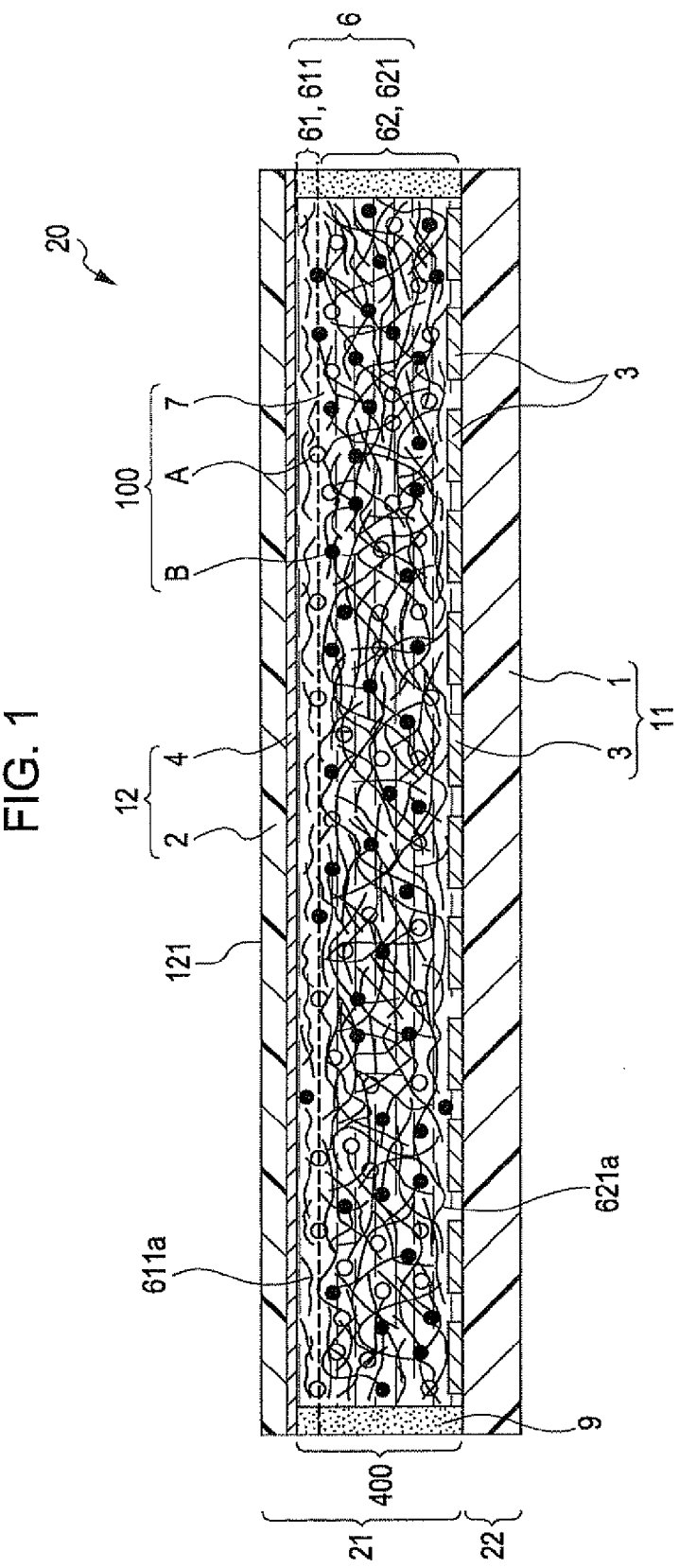
FIG. 1 is a cross-sectional view illustrating a display device according to a first embodiment of the invention.
Figure 2:
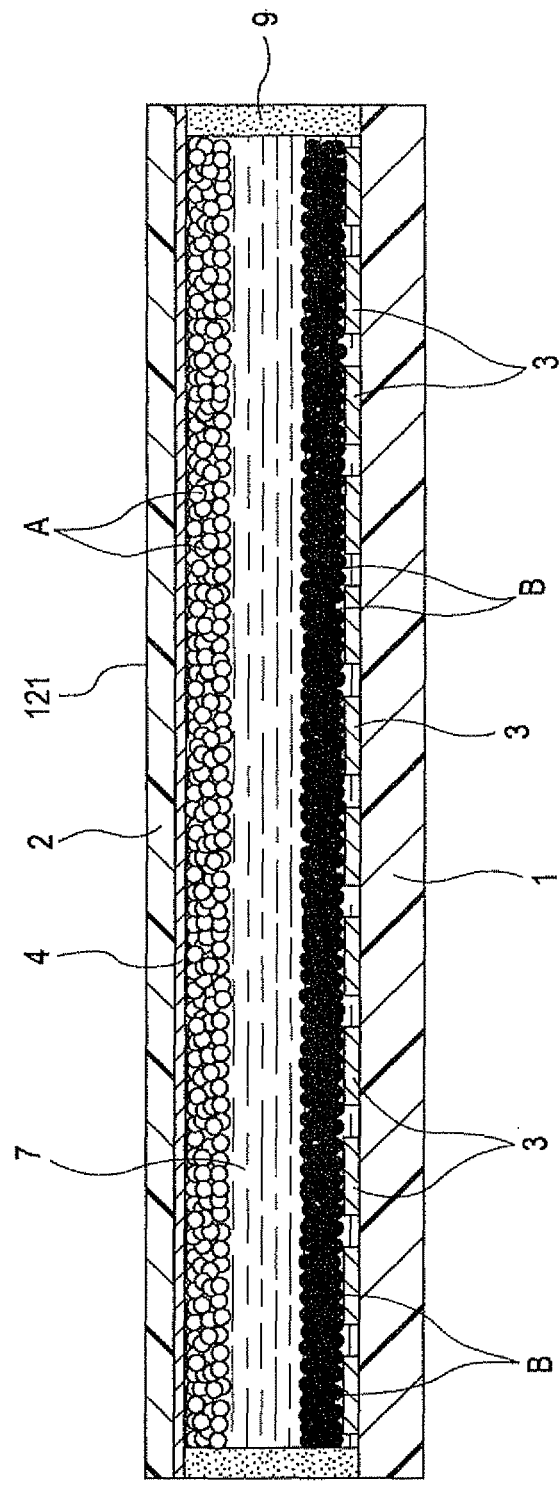
FIG. 2 is a view illustrating a problem of a display device of the related art.
Figure 3:
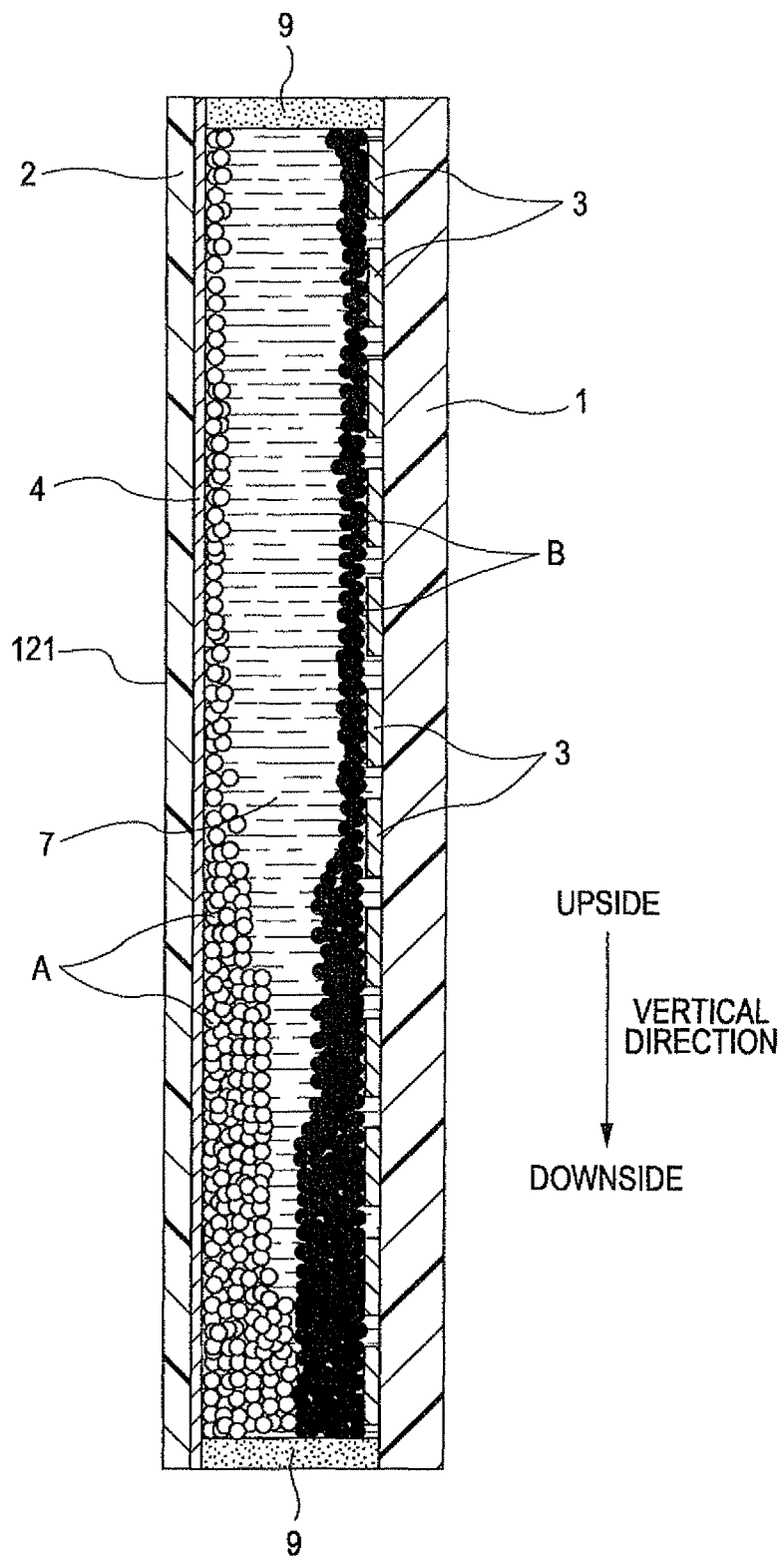
FIG. 3 is a view illustrating a problem of a display device of the related art.

FIG. 1 is a cross-sectional view illustrating a display device according to a first embodiment of the invention, FIG. 2 and FIG. 3 are views illustrating problems of a display device of the related art, and FIG. 4A to FIG. 5B are cross-sectional views illustrating an operation and an effect of the display device shown in FIG. 1. Hereinafter, for convenience of description, the upside of FIG. 1 to FIG. 5B is referred to as "up" and the downside is referred to as "down".

A display device (a display device of the invention) 20 shown in FIG. 1 is an electrophoretic display device displaying a desired image using electrophoresis of particles. The display device 20 has a display sheet (front plane) 21 and a circuit board (back plane) 22.

As shown in FIG. 1, the display sheet 21 has a substrate 12 (first substrate) provided with a planar base portion 2 and a second electrode 4 provided on a lower face of the base portion 2, and a display layer 400 provided on the substrate 12 and filled with a dispersion liquid 100. In such a display sheet 21, the surface of the substrate 12 constitutes a display face 121. Hereinafter, the display face 121 denotes an area overlapped with the display layer 400 on the surface of the substrate 12 in the plan view of the display device 20, and excludes the other area (e.g., an area overlapped with a seal portion 9 to be described later).

The circuit board 22 includes an opposed substrate 11 provided with a planar base portion 1 and a plurality of first electrode 3 provided on the surface of the base portion 1, and a circuit (not shown) provided on the opposed substrate 11.

For example, the circuit includes TFTs (switching devices) arranged in a matrix, gate lines and data lines formed corresponding to the TFTs, a gate driver that applies a desired voltage to the gate lines, a data driver that applies a desired voltage to the data lines, and a control unit that controls driving of the gate driver and the data driver.

In such a display device 20, the opposed substrate 11 also serves as the second substrate of the display sheet 21.

Hereinafter, the configuration of the units will be sequentially described.

Each of the base portion 1 and the base portion 2 is formed of a sheet-shaped (planar) member, and has a function of supporting and protecting members provided therebetween. The base portions 1 and 2 may be formed of any of a rigid material and a flexible material, but it is preferable that they have flexibility. By using the flexible base portions 1 and 2, it is possible to obtain the flexible display device 20, that is, the display device 20 useful to construct an electronic paper.

When the base portions (base layers) 1 and 2 have flexibility, the constituent material thereof may be, for example, polyester such as PET (polyethylene terephthalate) and PEN (polyethylene naphthalate), polyolefin such as polyethylene, and various kinds of thermoplastic elastomer such as denatured polyolefin, polyamide, thermoplastic polyimide, polyether, polyether ether ketone, polyurethane series, chlorinated polyethylene series, or copolymer, blend bodies, and polymer alloy based thereon, and one kind, two kinds or more thereof may be mixed.

Each of average thicknesses of the base portions 1 and 2 is appropriately set according to constituent materials, uses, or the like, and is not particularly limited. However, in a case of having flexibility, it is preferably equal to or more than about 20 µm and equal to or less than 500 µm, and more preferably equal to or more than about 25 µm and equal to or less than 250 µm. Accordingly, it is possible to reduce the size (particularly, thickness) of the display device 20 while achieving balance between flexibility and strength of the display device 20.

The first electrode 3 and the second electrode 4 having a film type are provided on the faces of the base portions 1 and 2 on the display layer 400 side, that is, the upper face of the base portion 1 and the lower face of the base portion 2, respectively. In the embodiment, the second electrode 4 is considered as a common electrode, and the first electrode 3 divided in a matrix shape is considered as an individual electrode (a pixel electrode connected to TFT). In the display device 20, an area where one first electrode 3 and one second electrode 4 are overlapped constitutes one pixel.

When each of the constituent materials of the electrode 3 and 4 substantially has conductivity, it is not particularly limited. The material may be various conductive materials, for example, a metal material such as gold, silver, copper, aluminum, or alloy including them, a carbon-based material such as carbon black, an electrical conductive polymer material such as polyacetylene, polyfluorene, or derivatives thereof, an ionic conductive polymer material in which an ionic material such as NaCl and $Cu(CF_3SO_3)_2$ is dispersed in matrix resin such as polyvinyl alcohol and polycarbonate, and a conductive material such as indium oxide (IO), indium tin oxide (ITO), and fluorine-doped tin oxide (FTO), and one kind, two kinds or more thereof may be combined.

Each of average thicknesses of the electrodes 3 and 4 is appropriately set according to its constituent materials, uses, or the like, and is not particularly limited. However, it is preferably equal to or more than about 0.01 µm and equal to or less than 10 µm, and more preferably equal to or more than about 0.02 µm and equal to or less than 5 µm.

The base portion and electrode provided on the display face 121 side among the base portions 1 and 2 and the electrodes 3 and 4 have optical transparency, that is, substantially transparent (colorless transparent, colored transparent, or semi-transparent). In the embodiment, the surface of the substrate 12 constitutes the display face 121, and thus at least the base portion 2 and the second electrode 4 are substantially transparent. Accordingly, it is possible to easily and visually recognize a state of white particles A and black particles B in the dispersion liquid 100, that is, information (image) displayed on the display device 20 from the display face 121 side.

A seal portion 9 is provided between the substrate 12 and the opposed substrate 11 along a periphery thereof. The display layer 400 is air-tightly sealed by the seal portion 9. Accordingly, the dispersion liquid 100 is prevented from leaking out of the display device 20 moisture is prevented from filtering into the display device 20, and thus it is possible to more reliably prevent display performance of the display device 20 from deteriorating.

The constituent material of the seal portion 9 is not particularly limited, and may be various resin materials, for example, thermoplastic resin such as acrylic resin, urethane resin, and olefin resin, and thermosetting resin such as epoxy resin, melamine resin, and phenol resin, and one kind, two kinds or more thereof may be combined.

The display layer 400 is filled with the dispersion liquid 100. A particle constrained layer 6 fixed by a pillar member 8 is provided in the display layer 400.

In the dispersion liquid 100, the white particles (first particles) A and the black particles (second particles) B, which are charged with polarities reverse to each other, are dispersed in the dispersion medium 7.

A medium with a relatively high insulating property is most preferably used as the dispersion medium 7. The dispersion medium 7 may be, for example, various kinds of waters (e.g., distilled water, pure water, etc.), alcohol series such as methanol, cellosolve series such as methyl cellosolve, ester series such as methyl acetate, ketone series such as acetone, aliphatic hydrocarbon series (liquid paraffin) such as pentane, alicyclic hydrocarbon series such as cyclohexane, aromatic hydrocarbon series such as benzene, halogenated hydrocarbon series such as methylene chloride, aromatic heterocycle series such as pyridine, nitrile series such as acetonitrile, amide series such as N,N-dimethylformamide, carboxylate, silicon oil, or various oils, and they may be used alone or as a mixture.

The main component of the dispersion medium 7 is preferably aliphatic hydrocarbon series (liquid paraffin) or silicon oil. The dispersion medium 7, the main component of which is liquid paraffin or silicon oil, is preferable from the viewpoint that the cohesion suppressing effect of the white particles A and the black particles B is high. Accordingly, it is possible to more reliably prevent and suppress the display performance of the display device 20 from deteriorating with the lapse of time. Since the liquid paraffin or silicon oil does not have an unsaturated bond, it is also preferable from the viewpoint that climate resistance is excellent and stability is high.

In the dispersion medium 7, as necessary, various additives, for example, a surfactant (negative ionic or positive ionic) such as electrolyte and alkenyl succinate ester, a charge control agent formed of metal soap, resin material, rubber material, oils, varnish, and particles such as compounds, a dispersant such as a silane-based coupling agent, a lubricant, and a stabilizing agent. When the dispersion medium 7 is colored, various kinds of dyes such as anthraquinone-based dyes, azoic dyes, and indigoid-based dyes may be dissolved in the dispersion medium 7 as necessary.

The white particles A and the black particles B have charges, and are particles capable of electrophoresing in the dispersion medium 7 by action of electric field. Any of the white particles A and the black particles B may be used if they have charges, and they are not particularly limited thereto. However, at least one kind of pigment particles, resin particles, or complex particles thereof is most preferably used. Such particles have an advantage that it is easy to produce the particles, and it is possible to relatively easily perform control of charges.

The pigment constituting the pigment particles may be, for example, a black pigment such as aniline black, carbon black, titanium black, and chromite copper, a white pigment such as titanium oxide and antimony oxide, an azoic pigment such as monoazo, a yellow pigment such as iso-indolinone, and chrome yellow, a red pigment such as quinacridone red and chrome vermilion, a blue pigment such as phthalocyanine blue and indanthrene blue, and a green pigment such as phthalocyanine green, and one kind, two kinds or more thereof may be combined.

The resin material constituting the resin particles may be, for example, acrylic resin, urethane resin, urea resin, epoxy resin, polystyrene, and polyester, and one kind, two kinds or more thereof may be combined.

The complex particles may be, for example, particles in which surfaces of pigment particles are coated with resin materials or other pigments, particles in which surfaces of resin particles are coated with pigments, and particles formed of a mixture in which pigments and resin materials are mixed in a proper composition ratio.

The particles in which the surfaces of the pigment particles are coated with the other pigments may be, for example, particles in which surfaces of titanium oxides are coated with silicon oxides or aluminum oxides, and the particles are most preferably used as the white particles A. Carbon black particles or particles in which the surfaces thereof are coated are most preferably used as the black particles B.

The shapes of the white particles A and the black particles B are not particularly limited, but a rectangular shape is preferable. The average particle diameters of the white particles A and the black particles B are not particularly limited, but they are preferably equal to or more than 10 nm and equal to or less than 500 nm, and more preferably equal to or more than 20 nm and equal to more than 300 nm. When the average particle diameter of the white particles A and the black particles B is less than 10 nm, it is difficult to obtain sufficient chromaticity, contrast is decreased, and thus the display may not be clear. On the contrary, when the average particle diameter of the white particles A and the black particles B is more than 300 nm, it is necessary to raise the coloration degree of the particles more than needs. Accordingly, the amount of used pigments or the like is increased, rapid movement of the particles is difficult at a part to which voltage is applied for display, and thus the response speed may be decreased.

The diameter of the white particles A and the black particle B means a volume average particle diameter measured by a dynamic light scattering particle size distribution measuring device (e.g., Product Name: LB-500, Horiba, Ltd.).

In the embodiment, the average particle diameters of the white particles A and the black particles B are substantially the same.

Next, the particle constrained layer 6 will be described, but in front thereof, a problem occurring when the particle constrained layer 6 is not provided will be described.

When a predetermined voltage is applied between the electrodes 3 and 4, as shown in FIG. 2, the white particles A may be collected on the second electrode 4 (substrate 12) side of the display layer 400, and the black particles B may be collected on the first electrode 3 (opposed substrate 11) of the display layer 400. Accordingly, the whole area of the display face 121 becomes a white display state.

Herein, it is assumed that the display device 20 is visible in an upright state like a book carried in the hand. As shown in FIG. 3, when the display device 20 is not provided with the particle constrained layer 6 is kept upright like a book, in the white particles A, particles coming in contact with the second electrode 4 or particles positioned in the vicinity of the second electrode 4 are kept in position by absorption force of the second electrode 4. However, the absorption force does not act between particles relatively separated from the second electrode 4 and the second electrode 4 (or the absorption force is very small), and thus the particles moves (precipitates) down in the vertical direction by gravity. The same is applied to the black particles B.

When such a phenomenon occurs, a bias of the white particles A and the black particles B occurs in the display layer 400, an image displayed on the display face 121 becomes an irregular image. It is difficult to obtain high reflexibility at pixels in which the number of white particles A is reduced by the movement (precipitation) of the white particles A, and thus contrast is decreased.

As described above, in the display device of the related art in which the particle constrained layer 6 is not provided, reliability is short and it is difficult to exhibit excellent display characteristics.

When the precipitation of the white particles A and the black particles B occurs, it is difficult to uniformly disperse the white particles A and the black particles B in the display layer 400 again, and for example, it is necessary to reset the display. For this reason, when it is difficult to reset the display, the display is kept with the display characteristics deteriorating. Alternatively, when the display is reset to restore the display characteristics, the display is stopped once, and thus convenience of the display device 20 deteriorates.

The particle constrained layer 6 solves such a problem, that is, prevent or suppress the white particles A and the black particles B from moving (precipitating) down in the vertical direction, such that the display device 20 exhibits excellent display characteristics.

Hereinafter, the particle constrained layer 6 will be described in detail.

As shown in FIG. 1, the particle constrained layer 6 is provided in the display layer 400. Such a particle constrained layer 6 has a function of allowing the white particles A and the black particles B to move in the thickness direction of the display layer 400, and preventing them from moving in the in-plane direction of the display layer 400. As will be described later, the function is a function in which the white particles A and the black particles B can move in the thickness direction of the display layer 400 when voltage is applied between the electrodes 3 and 4, and the white particles A and the black particles B are prevented from moving in the plane direction (downward in the vertical direction) of the display layer 400 in the state where the voltage is not applied to the electrodes 3 and 4.

For this reason, the particle constrained layer 6 may have different particle constraint force in the thickness direction and the plane direction of the display layer 400, that is, may have anisotropy in particle constraint force. In this case, it is preferable that the particle constraint force in the plane direction other than the thickness direction of the display layer 400 be raised. With such a configuration, it is possible to more reliably exhibit the function.

The particle constrained layer 6 may have the same particle constraint force in the thickness direction and the plane direction of the display layer 400. In this case, the particle constraint force of the particle constrained layer 6 may have a strength to the extent in which the white particles A and the black particles B do not move in the particle constrained layer 6 according to gravity of the white particles A and the black particles B, and can move in the particle constrained layer 6 in a state where a predetermined voltage or more is applied between the electrodes 3 and 4. With such a configuration, it is possible to more reliably exhibit the function.

The particle constrained layer 6 having the function is not particularly limited, but is preferably any one of a porous body and an aggregate of fibers. With such a configuration, it is possible to obtain the particle constrained layer 6 with the excellent function and a relatively simple configuration.

The porous body may be, for example, a carbonaceous porous body such as carbon paper, carbon cloth, and carbon felt, porous ceramic such as porous silica, porous alumina, and porous titanium dioxide, foam such as polystyrene foam, urethane foam, and polyimide foam, and zeolite. The aggregate of fibers may be textile fabrics formed by weaving predetermined fabrics, and an unwoven body formed by not including predetermined fibers.

On the substrate 12, the particle constrained layer 6 has a density gradient in which a volume density of the substrate 12 side is lower than that of the opposed substrate 11 side. Specifically, the particle constrained layer 6 has a first particle constrained layer 61, and a second particle constrained layer 62 provided closer to the opposed substrate 11 side than the first particle constrained layer 61. The volume density of the first particle constrained layer 61 is lower than that of the second particle constrained layer 62.

The first particle constrained layer 61 is provided in contact with the substrate 12, and the second particle constrained layer 62 is provided in contact with the opposed substrate 11. The first particle constrained layer 61 and the second particle constrained layer 62 are provided in contact with each other. That is, the particle constrained layer 6 is provided throughout the almost whole area of the display layer 400.

According to such a particle constrained layer 6, it is possible to exhibit the following effects.

First, the particles (the white particles A and the black particles B) move in the particle constrained layer 6, and it is possible to prevent the particles from moving in the plane direction (direction perpendicular to the thickness direction) of the display layer 400. For this reason, when the display device 20 is upright, it is possible to prevent and suppress the particles from precipitating, and the display device 20 exhibits excellent display characteristics.

Second, since the volume density of the first particle constrained layer 61 positioned on the substrate 12 (display face 121) side is lower than that of the second particle constrained layer 62, the particle constrained layer 6 does not stand out or is not visually recognized as viewed from the display face 121. For this reason, it is possible to prevent the particle constrained layer 6 from having a negative influence on the image display of the display device 20, and the display device 20 exhibits excellent display characteristics.

That is, in the particle constrained layer 6, the second particle constrained layer 62 is a layer taking a serious view of the constraint property of the particles, and the first particle constrained layer 61 is a layer exhibiting the constraint property of the particles and taking a serious view of invisibility from the display face 121.

The first particle constrained layer 61 is formed of an aggregate of fibers 611a, specifically, an unwoven body 611 formed not including the fibers 611a. Similarly, the second particle constrained layer 62 is also formed of an aggregate of fibers 621a, specifically, an unwoven body 621 formed not including the fibers 621a.

Since the unwoven body can be designed independently from a fiber length and a distance between fibers, the first particle constrained layer 61 and the second particle constrained layer 62 are formed of the unwoven bodies, and thus it is possible to form the first particle constrained layer 61 and the second particle constrained layer 62 exhibiting a desired function.

The fibers 611a and the fibers 621a may be synthesized resin, for example, polyester resin such as PET, polyarylate resin, polyacetal resin, acrylic resin, polyamide resin, polyurethane resin, polyolefin resin, polyvinyl resin, polycarbonate resin, polyether resin, and polyphenyl resin, and fibers derived from animals such as sheep wool and rabbit wool may be used. In addition, fibers derived from plants taken from trees or grasses, glass fiber, inorganic fibers such as asbestos, and mineral fibers may be used. Among them, it is preferable to use fibers formed of polyester or polyamide from the viewpoint of strength, cost, and harmony with electrophoretic display liquid.

The fibers 611a and 621a may be single-core fibers called monofilament fibers, in addition to multi-core fibers called multifilament fibers. The fibers 611a and 621a may be a complex material obtained by combining the materials, and may be complex fibers obtained by combining and twisting a plurality of fibers.

A diameter of the fibers 611a and 621a is preferably small from the viewpoint of various performances such as display characteristics and responsiveness. Specifically, the diameter is preferably equal to or more than 100 nm and equal to or less than 100 µm, and more preferably equal to or more than 1 µm and equal to or less than 50 µm.

The cross-sectional shape of the fibers 611a and 621a is not particularly limited, but is preferably a circular shape. Accordingly, it is possible to smoothly perform the movement of the white particles A and the black particles B in the dispersion liquid 100.

An average pore diameter of the unwoven bodies 611 constituting the first particle constrained layer 61 is not particularly limited if the average pore diameter is a size in which the white particles A and the black particles B can move in the unwoven bodies 611 when the electric field is applied. However, specifically, the average pore diameter is preferably equal to or more than 10 times the average particle diameter of the white particles A (the black particles B) and substantially equal to or less than 10000 times, and more preferably equal to or more than 20 times and substantially equal to or less than 1000 times.

Since the average pore diameter of the unwoven bodies 611 is such a size, it is possible to smoothly move the white particles A and the black particles B in the thickness direction of the display layer 400 in the first particle constrained layer 61, and it is possible to prevent the white particles A and the black particles B from moving in the plane direction of the display layer 400. In addition, since it is possible to relatively reduce the amount of fibers 611a used to form the first particle constrained layer 61, the first particle constrained layer 61 does not stand out (difficult to visually recognize) as viewed from the display face 121.

The average pore diameter of the unwoven bodies 621 constituting the second particle constrained layer 62 is not particularly limited if it is a size in which the white particles A and the black particles B can move in the unwoven bodies 611 when electric field is applied, but it is preferably less than the average pore diameter of the unwoven bodies 611. Specifically, the average pore diameter of the unwoven bodies 621 is preferably equal to or more than the average particle diameter of the white particles A (the black particles B) and substantially equal to or less than 5000 times, and more preferably equal to or more than 10 times and substantially equal to or less than 500 times.

Since the average pore diameter of the unwoven bodies 621 is such a size, it is possible to smoothly move the white particles A and the black particles B in the thickness direction of the display layer 400 in the second particle constrained layer 62, and it is possible to more effectively prevent the white particles A and the black particles B from moving in the plane direction of the display layer 400.

The average pore diameter of the unwoven bodies 611 and 621 is acquired by SEM observation of the cross sections of the unwoven bodies 611 and 621. Specifically, the average pore diameter of the unwoven bodies 611 and 621 is acquired by measuring pore diameters of arbitrary 100 points of pores observed in the cross sections of the unwoven bodies 611 and 621, as an average value of the points.

A void ratio of the first particles constrained layer 61 is preferably substantially equal to or more than 70% and equal to or less than 99%, and more preferably equal to or more than 75% and equal to or less than 85%. Since the void ratio of the first particle constrained layer 61 is in such a numerical range, it is possible to smoothly move the white particles A and the black particles B in the thickness direction of the display layer 400 in the first particle constrained layer 61, and it is possible to prevent the white particles A and the black particles B from moving in the plane direction of the display layer 400. In addition, since it is possible to relatively reduce the amount of fibers 611a used to form the first particle constrained layer 61, the first particle constrained layer 61 does not stand out (difficult to visually recognize) as viewed from the display face 121.

A void ratio of the second particles constrained layer 62 is preferably less than the void ratio of the first particle constrained layer 61, preferably equal to or more than 50% and equal to or less than 90%, and more preferably substantially equal to or more than 60% and equal to or less than 80%. Since the void ratio of the second particle constrained layer 62 is in such a numerical range, it is possible to smoothly move the white particles A and the black particles B in the thickness direction of the display layer 400 in the second particle constrained layer 62, and it is possible to more effectively prevent the white particles A and the black particles B from moving in the plane direction of the display layer 400.

The thickness of the first particle constrained layer 61 is not particularly limited, but is preferably substantially equal to or more than 10 nm and about 5 μm. Accordingly, it is possible to sufficiently separate the second particle constrained layer 62 from the substrate 12. For this reason, it is possible to effectively prevent the second particle constrained layer 62 from being visible from the display face 121.

A value of H1/H2 is preferably equal to or more than 0.1 and equal to less than 0.5 and more preferably equal to or more than 0.2 and equal to or less than 0.4 where a thickness of the first particle constrained layer 61 is H1 and a thickness of the second particle constrained layer 62 is H2. Since the value is in such a numerical range, it is possible to sufficiently raise the ratio of the second particle constrained layer 62 occupied in the display layer 400. As described above, since the constraint property of the second particle constrained layer 62 is higher than that between the first particle constrained layer 61 and the second particle constrained layer 62, it is possible to more effectively prevent or suppress the white particles A and the black particles B from precipitating as described above by making the ratio of the second particle constrained layer 62 being in the numerical ratio. In addition, by the numerical range, since the thickness of the first particle constrained layer 61 can be the thickness to the extent that the second particle constrained layer 62 does not stand out from the display face 121, it is possible to prevent the display characteristics from deteriorating.

2. Method of Driving Display Device

The display device 20 is driven as follows.

When voltage is applied between the electrodes 3 and 4, electric field occurs therebetween. The white particles A and the black particles B move (electrophorese) toward any of the electrodes 3 and 4 according to the electric field, respectively. Hereinafter, a case where the white particles A have positive charges and the black particles B have negative charges will be representatively described. Hereinafter, for convenience of description, one pixel will be representatively described.

White Display State

When voltage by which the first electrode 3 is positive potential and the second electrode 4 is negative potential is applied between the first electrode 3 and the second electrode 4, the electric field generated by applying the voltage acts on the white particles A and the black particles B in the display layer 400. Then, as shown in FIG. 4A, the white particles A electrophorese to the second electrode 4 and are collected on the second electrode 4, and the black particles B electrophorese to the first electrode 3 and are collected on the first electrode 3. Accordingly, it becomes a white display state where white is displayed on the display face 121.

In this case, the white particles A are positioned in the first particle constrained layer 61. As described above, the void ratio of the first particle constrained layer 61 is higher than that of the second particle constrained layer 62, a number of white particles A are collected therein. Accordingly, it is difficult that the first particle constrained layer 61 is visible from the display face 121. For this reason, it is possible to prevent or suppress the first particle constrained layer 61 from having a negative influence on the displayed image.

In this state, when the display device 20 is upright, the white particles A are constrained in the first particle constrained layer 61 and the black particles B are constrained in the second particle constrained layer 62. Accordingly, the white particles A and the black particles B are prevented or suppressed from moving down in the vertical direction.

Black Display State when voltage by which the first electrode 3 is positive potential and the second electrode 4 is negative potential is applied between the first electrode 3 and the second electrode 4, the electric field generated by applying the voltage acts on the white particles A and the black particles B in the display layer 400. Then, as shown in FIG. 5A, the white particles A electrophorese to the first electrode 3 and are collected on the first electrode 3, and the black particles B electrophorese to the second electrode 4 and are collected on the second electrode 4. Accordingly, it becomes a black display state where black is displayed on the display face 121.

In this case, the black particles B are positioned in the first particle constrained layer 61. As described above, the void ratio of the first particle constrained layer 61 is higher than that of the second particle constrained layer 62, and the black particles B are collected therein. Accordingly, it is difficult that the first particle constrained layer 61 is visible from the display face 121. For this reason, it is possible to prevent or suppress the second particle constrained layer 62 from having a negative influence on the displayed image.

In this state, when the display device 20 is upright, the black particles B are constrained in the first particle constrained layer 61 and the white particles A are constrained in the second particle constrained layer 62. Accordingly, the white particles A and the black particles B are prevented or suppressed from moving down in the vertical direction.

According to such a display device 20, since it is possible to prevent or suppress the white particles A collected on the second electrode 4 side from unintentionally moving, it is possible to keep the white display state having high reflectance. Similarly, since it is possible to prevent or suppress the black particles B collected on the second electrode 4 side from unintentionally moving, it is possible to keep the black display state having low reflectance. Accordingly, it is possible to exhibit high contrast.

Since it is possible to effectively prevent or suppress the bias of the particles (the white particles A and the black particles B) in the display layer 400, it is possible to display a clear image without irregularity on the display face 121. Since the fibers 611a constituting the first particle constrained layer 61 is sufficiently thin, it is possible to dispose the particles (the white particles A and the black particles B) throughout the almost whole area of the display face 121. Accordingly, the almost whole area of the display face 121 can be a effective display area, and thus it is possible to display a clearer image.

In the display device 20, the white display state or the black display state is selected for each pixel, that is, the pixels in the white display state and the black display state are combined, and thus it is possible to display a desired image on the display face 121.

Particularly, in the embodiment, since the average particle diameters of the white particles A and the black particles B are the same, it is possible to the effect in the pixels in the white display state and the black display state. For this reason, the display characteristics of the display device 20 are further improved.

Second Embodiment

Figure 6:
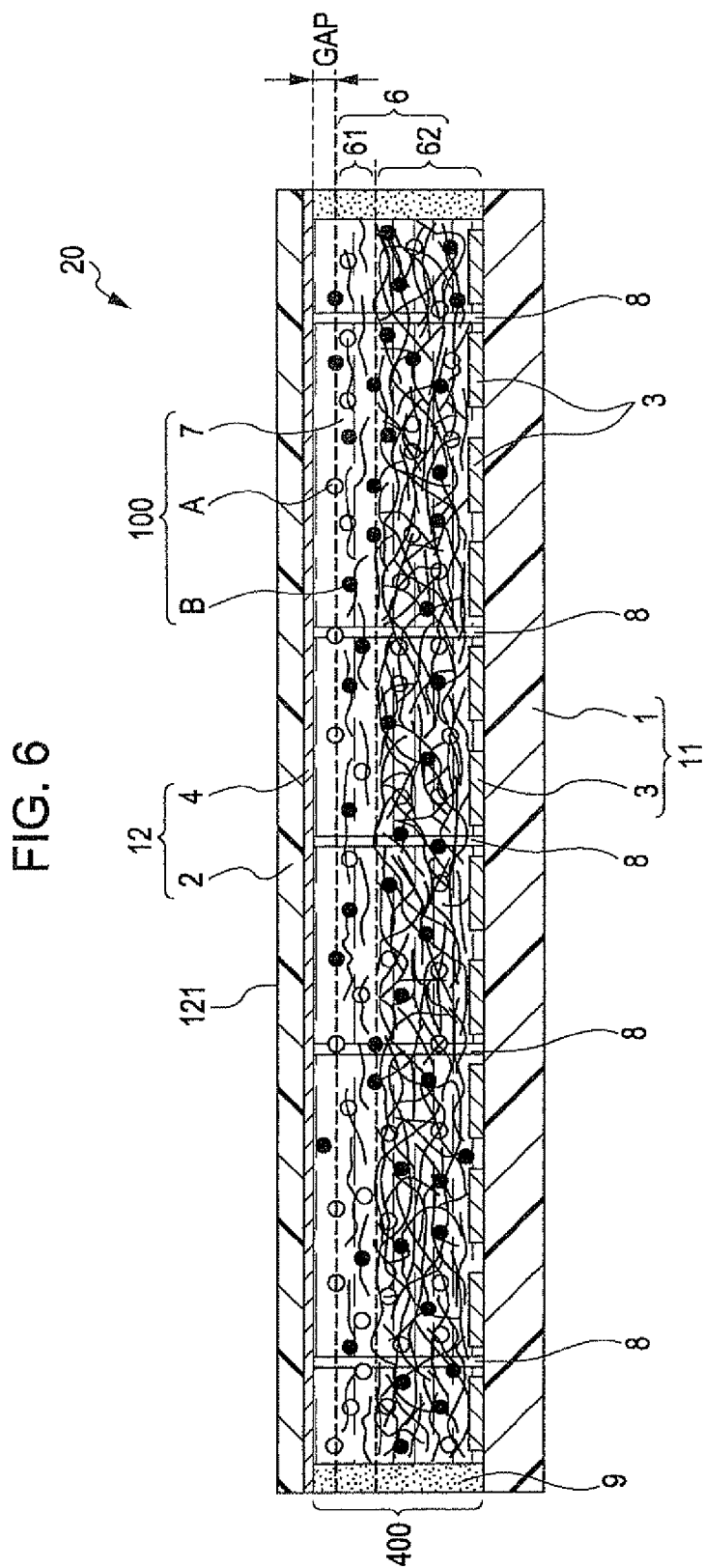
FIG. 6 is a cross-sectional view illustrating a display device according to a second embodiment of the invention.

FIG. 6 is a cross-sectional view illustrating a display device according to a second embodiment of the invention, and FIG. 7A and FIG. 7B are cross-sectional views illustrating an operation and an effect of the display device shown in FIG. 6.

Hereinafter, a difference of the second embodiment from the above-described embodiment will be mainly described, and the description of the same contents will be omitted.

The display device according to the second embodiment of the invention is the same as the display device of the first embodiment, except the disposition of the particle constrained layer. In addition, the same reference numerals and signs are given to the same configurations as those of the first embodiment.

As shown in FIG. 6, the first particle constrained layer 61 is separated from the substrate 12. Accordingly, the first particle constrained layer 61 is covered by the particles (the white particles A or the black particles B) collected on the substrate 12 side, and the first particle constrained layer 61 is not visible from the display face 121. Therefore, it is possible to more reliably prevent the first particle constrained layer 61 from having a negative influence on the display. For this reason, the display device 20 can exhibit superior display characteristics. In addition, it is possible to collect the particles (the white particles A or the black particles B) in the whole area of the display face 121. For this reason, the almost whole area of the display face 121 can be the effective display area, and the display device 20 can exhibit excellent display characteristics.

The separation distance between the particle constrained layer 6 (the first particle constrained layer 61) and the substrate 12 is not particularly limited, but when the average particle diameter of the white particles A (the black particles B) is R, the separation distance is preferably substantially equal to or more than R and substantially equal to or less than 5R, and more preferably equal to or more than 2R and equal to or less than 3R. The separation distance between the particle constrained layer 6 and the substrate 12 is not particularly limited if it satisfies the numerical range, specifically, it is preferably equal to or less than about 5 μm. Accordingly, as will be described later, in addition to the above-described effect, it is possible to more effectively prevent or suppress the white particles A and the black particles B from moving down in the vertical direction when the display device 20 is upright.

As shown in FIG. 6, the separation distance between the particle constrained layer 6 and the substrate 12 is kept by a plurality of pillar members 8. Specifically, the pillar members 8 is provided to pass through the particle constrained layer 6, the fibers 611a and 621a included in the particle constrained layer 6 entangled with the pillar members 8 to fix the particle constrained layer 6 to the substrate 12. Accordingly, the separation distance between the particle constrained layer 6 and the substrate 12 is kept.

The pillar members 8 are provided to extend in the thickness direction of the display layer 400, one end thereof is joined with the substrate 12, and the other end is joined with the opposed substrate 11. Accordingly, it is possible to use the pillar members 8 as reinforcement members for raising the strength of the display layer 400. Therefore, even when the display device 20 is curved, it is possible to keep the thickness of the display layer 400 substantially regular, and thus it is possible to keep the excellent display characteristics.

It is preferable that a cross-sectional area of the pillar member 8 is small as long as it can exhibit the function thereof. Accordingly, it is possible to make the pillar members 8 not stand out as viewed from the display face 121. The shape of the cross section of the pillar member 8 is not particularly limited, for example, may be circular, triangular, rectangular, and the like.

It is preferably that the constituent material of the pillar member 8 has an insulating property, and the material may be, for example, polyolefin such as polyethylene, polypropylene, ethylene-polyvinyl acetate copolymer, denatured plastic polyolefin, polyamide (e.g., nylon 6, nylon 66), various thermoplastic elastomers such as styrene series, polyvinyl chloride series, polyurethane series, polyester series, fluororubber series, chlorinated polyethylene series, or copolymer, blend bodies, polymer alloy mainly containing them. One kind, two kinds or more thereof may be mixed.

In the embodiment, the separation distance between the particle constrained layer 6 and the substrate 12 is kept by the pillar members 8, but for example, a spacer member formed of glass beads or the like may be provided between the first particle constrained layer 61 and the substrate 12 to keep the separation distance between the particle constrained layer 6 and the substrate 12.

Next, an operation of the display device 20 of the embodiment will be described. Hereinafter, the white display state will be representatively described, but the same effect can be exhibited for the black display state.

White Display State

When voltage by which the first electrode 3 is positive potential and the second electrode 4 is negative potential is applied between the first electrode 3 and the second electrode 4, the electric field generated by applying the voltage acts on the white particles A and the black particles B in the display layer 400. Then, as shown in FIG. 7A, the white particles A electrophorese to the second electrode 4 and are collected on the second electrode 4, and the black particles B electrophorese to the first electrode 3 and are collected on the first electrode 3. Accordingly, it becomes a white display state where white is displayed on the display face 121.

In this case, since the white particles A electrophoresing to the display face 121 side are collected on the second electrode 4, the particle constrained layer 6 (the first particle constrained layer 61) is covered by the white particles A as viewed from the display face 121 side. Accordingly, since the particle constrained layer 6 is not visible from the display face 121, the particle constrained layer 6 does not have a negative influence on the displayed image.

In this state, when the display device 20 is upright, it is possible to keep the positions of the particles coming in contact with the second electrode 4 and the particles positioned in the vicinity of the second electrode 4 in the white particles A by absorption force with respect to the second electrode 4. Since the particles irregularly and minutely move (Brownian motion) in the dispersion medium 7, it is possible to the positions as viewed macroscopically.

Meanwhile, the absorption force does not act on the particles, and the particles relatively separated from the second electrode 4 in the white particles A tend to move (precipitate) down in the vertical direction by gravity. However, as shown in FIG. 7B, the particles are constrained by the first particle constrained layer 61 or the second particle constrained layer 62, and thus the movement is prevented or suppressed.

Third Embodiment

Figure 8:
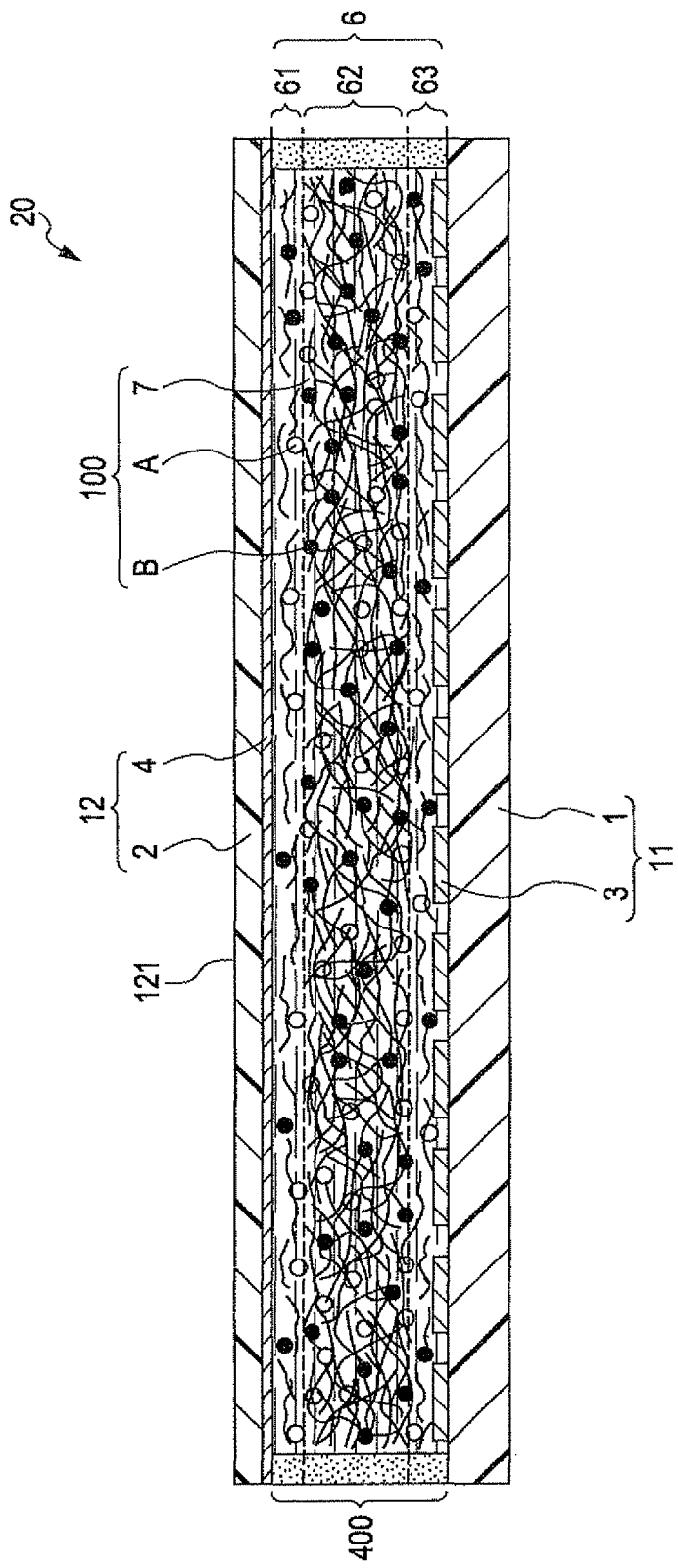
FIG. 8 is a cross-sectional view illustrating a display device according to a third embodiment of the invention.

FIG. 8 is a cross-sectional view illustrating a display device according to a third embodiment of the invention.

Hereinafter, a difference of the third embodiment from the above-described embodiment will be mainly described, and the description of the same contents will be omitted.

The display device according to the third embodiment of the invention is the same as the display device of the first embodiment, except the configuration of the particle constrained layer. In addition, the same reference numerals and signs are given to the same configurations as those of the first embodiment.

As shown in FIG. 8, the particle constrained layer 6 of the embodiment has a third particle constrained layer 63 provided on the opposed substrate 11 side of the second particle constrained layer 62. A void ratio of the third particle constrained layer 63 is set lower than that of the second particle constrained layer 62.

The void ratio of the third particle constrained layer 63 is not particularly limited if it is lower than the void ratio of the second particle constrained layer 62, but it is preferably equal to or more than 70% and equal to or less than 99%, and more preferably equal to or more than 75% and equal to or less than 85%. It is preferable that the third particle constrained layer 63 has the same configuration as that of the first particle constrained layer 61. With such a third particle constrained layer 63, it is possible to exhibit the following effects.

For example, in the white display state, the black particles B collected on the opposed substrate 11 side can be constrained by the second particle constrained layer 62 and the third particle constrained layer 63, and thus the black particles B are prevented from moving down in the vertical direction when the display device 20 is upright.

For example, when the state of erecting the display device 20 continues for a long time or a strong impact or vibration is applied to the display device 20, the white particles A and the black particles B may be biased in the display layer 400. In that case, it is necessary to apply refresh voltage such that the white particles A and the black particles B are uniformly dispersed in the display layer 400, to move the white particles A and the black particles B in the transverse direction (direction perpendicular to the thickness direction of the display layer 400), to uniformly disperse the white particles A and the black particles B in the display layer 400 again.

For example, the refresh voltage may be voltage for alternately repeating a state where positive voltage is applied to a predetermined first electrode 3 and negative voltage is applied to the other first electrode 3 and a state reverse thereto. Accordingly, the white particles A and the black particles B are vibrated and dispersed in the plane direction of the display layer 400. Particularly, the movement of the white particles A and the black particles B occurs on the first electrode 3 side where the first electrode 3 is provided. Accordingly, the first electrode 3 side of the particle constrained layer 6 is the third particle constrained layer 63 with a low void ratio, and thus it is possible to smoothly perform the movement of the white particles A and the black particles B described above.

As described above, when the display device 20 is upright, the particles are prevented from moving down in the vertical direction (the plane direction of the display layer 400) by the third particle constrained layer 63. On the other hand, when the refresh voltage is applied, the particles are allowed to move in the plane direction of the display layer 400. The reason is because the particles moving by the action of the electric field generated by applying the refresh voltage has moving force higher than that of the particles moving by gravity.

The embodiment has been described above, but for example, the third particle constrained layer 63 may be separated from the opposed substrate 11. In this case, the separation distance between the third particle constrained layer 63 and the opposed substrate 11 is not particularly limited, but it is preferable that the separation distance is equal to or more than the average particle diameter of the white particles A (the black particles B) and equal to or less than about 5 times, from the same reason described in the second embodiment described above.

Fourth Embodiment

Figure 9:
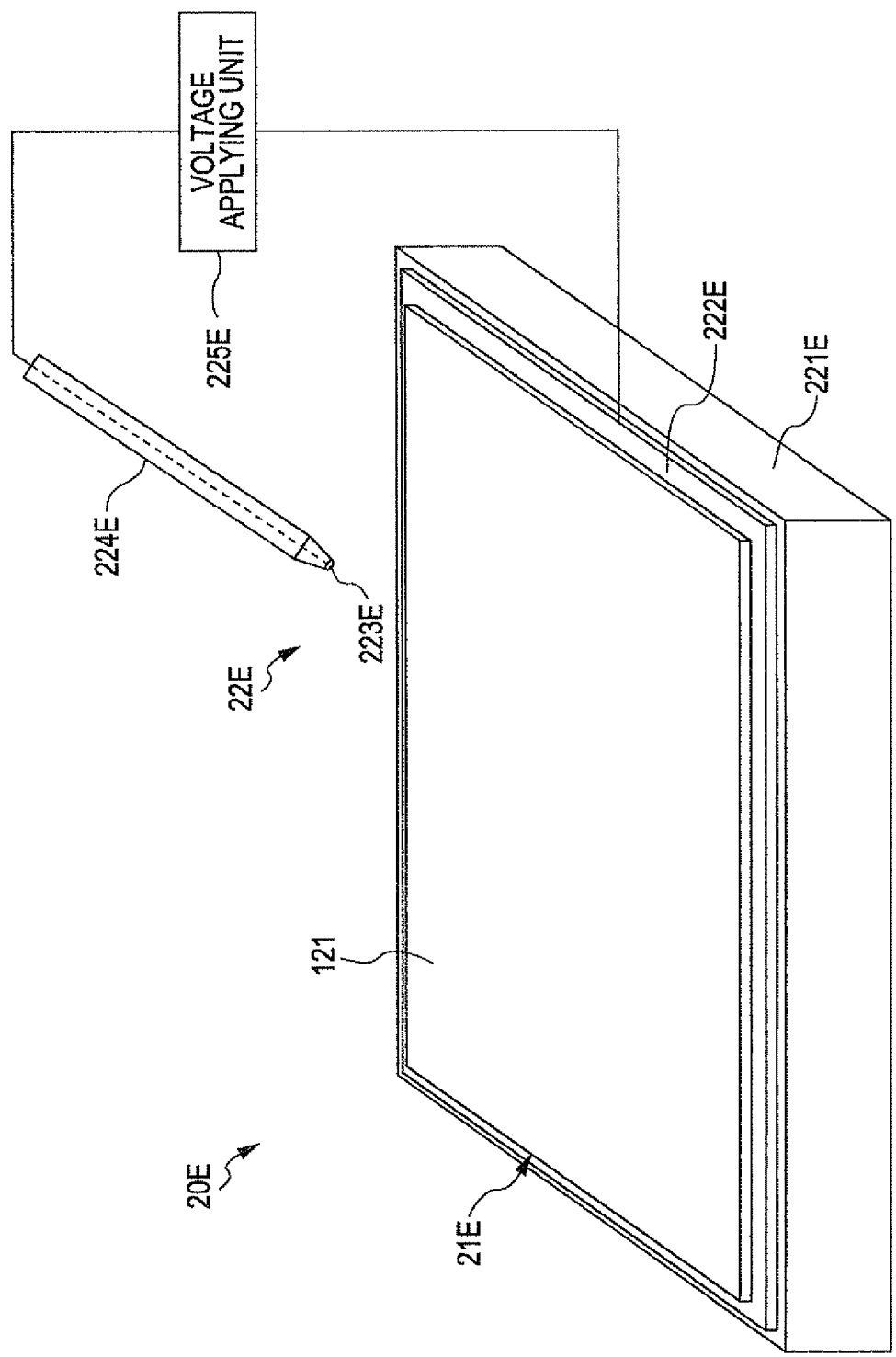
FIG. 9 is a perspective view illustrating a display device according to a fourth embodiment of the invention.
Figure 10:
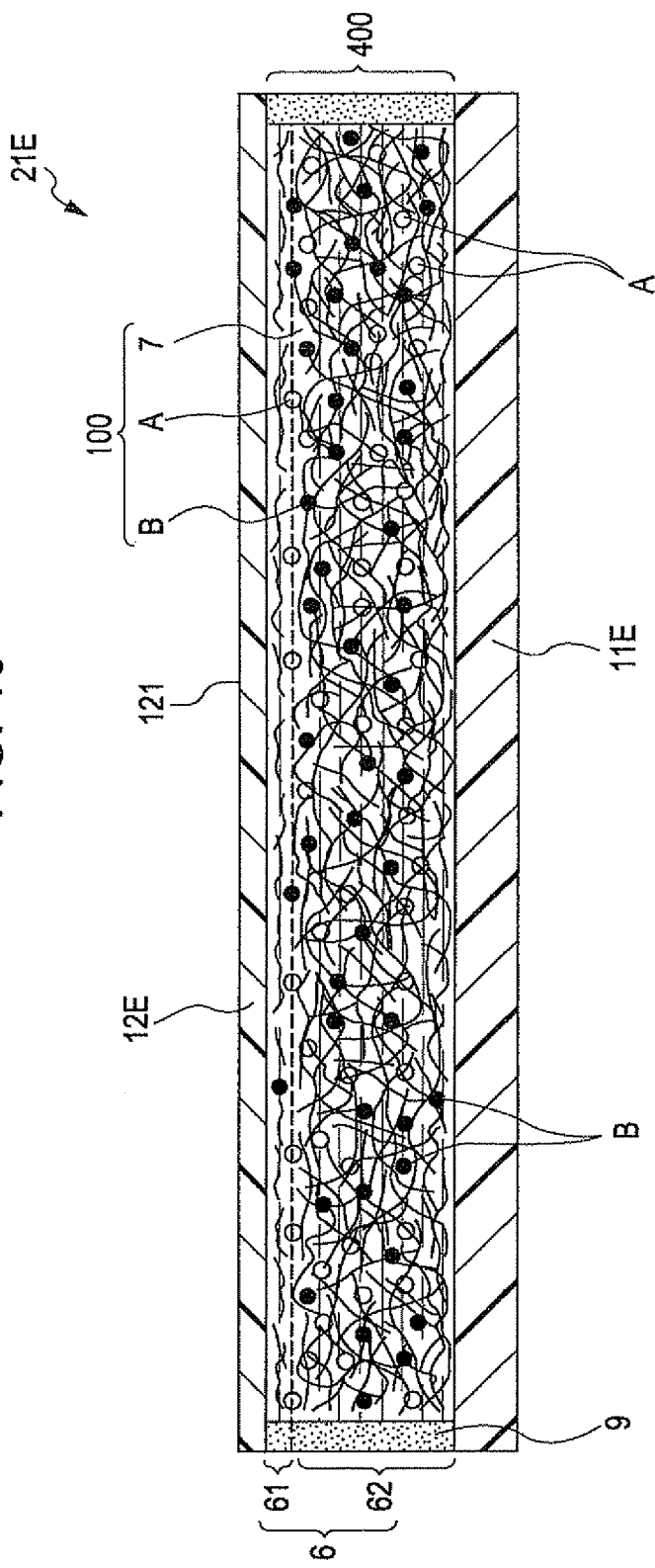
FIG. 10 is a cross-sectional view illustrating the display sheet shown in FIG. 9.

FIG. 9 is a schematic perspective view illustrating a display device according to a fourth embodiment of the invention, and FIG. 10 is a cross-sectional view illustrating a display sheet shown in FIG. 9.

Hereinafter, a difference of the fourth embodiment from the above-described embodiment will be mainly described, and the description of the same contents will be omitted.

The display device according to the fourth embodiment of the invention is the same as the display device of the first embodiment, except that a display sheet is separately configured.

As shown in FIG. 9, a display device 20E of the embodiment includes a display sheet 21E and a writing device 22E.

As shown in FIG. 10, the display sheet 21E includes a substrate (first substrate) 12E, a substrate (second substrate) 11E opposed to the substrate 12E, a display layer 400 provided between the substrate 12E and the substrate 11E, a particle constrained layer 6 provided in the display layer 400, and a seal portion 9 sealing the display layer 400. The substrates 12E and 11E have the same configuration as that of the base portion 2 of the substrate 12 of the first embodiment described above, and thus the description thereof is omitted.

The writing device 22E is a device used to write a desired image (pattern, color, letter, figure, or combination thereof) on the display sheet 21E. As shown in FIG. 9, the writing device 22E includes a base 221E, a sheet-shaped common electrode 222E provided on the base 221E, a writing pen (input tool) 224E provided with a partial electrode 223E at the leading end thereof, and a voltage applying unit 225E applying voltage between the common electrode 222E and the partial electrode 223E.

Such a display device 20E is used, for example, as follows.

The display sheet 21E in which the whole area of the display face 121 is in the white display state is placed on the common electrode 222E of the writing device 22E such that the display face 121 is upward. Then, voltage is applied between the common electrode 222E and the partial electrode 223E by the voltage applying unit 225E in which the partial electrode 223E side is low potential. In this state, when the writing pen 224E is moved in a desired trace while bringing it in contact with the display face 121, electrophoresis of particles occurs in an area corresponding to the trace, and the displayed color is changed from white to black.

According to the display device 20E, it is possible to draw a desired letter or the like on the display face 121 of the display sheet 21E in the same feeling as drawing a letter or the like on paper with a pencil. For this reason, an operation property (operation feeling) of the display device 20E is improved.

The display device 20 described above may be mounted on various electronic apparatus. The electronic apparatus provided with the electrophoretic display device of the invention may be, for example, an electronic paper, an electronic book, a television, a viewfinder, a monitor direct-view-type video tape recorder, a car navigation device, a pager, an electronic diary, a calculator, an electronic newspaper, a word processor, a personal computer, a workstation, a video phone, a POS terminal, and an apparatus provided with a touch panel.

The electronic paper of such electronic apparatuses will be described in detail by way of example.

Figure 11:
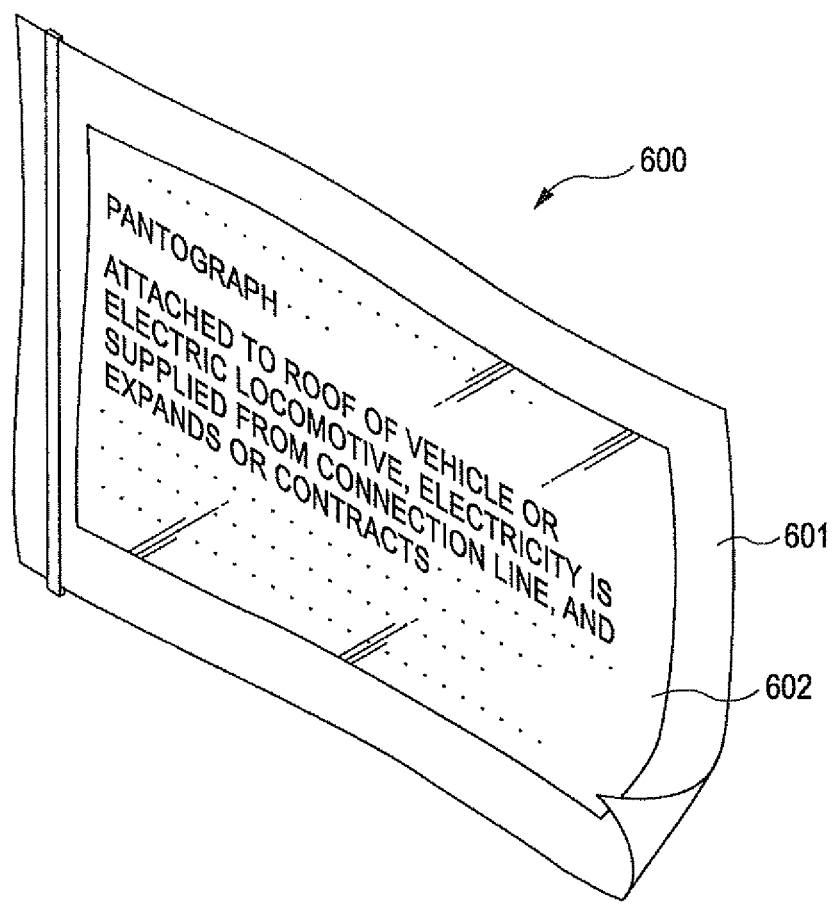
FIG. 11 is a perspective view illustrating an embodiment when an electronic apparatus of the invention is applied to an electronic paper.

FIG. 11 is a perspective view illustrating an electronic paper according to an embodiment to which the electronic apparatus of the invention is applied.

The electronic paper 600 shown in FIG. 11 includes a main body 601 formed of a rewritable sheet having the same feeling and flexibility as paper, and a display unit 602. In the electronic paper 600, the display unit 602 is formed of the display device 20 described above.

Next, an embodiment in which the electronic apparatus of the invention is applied to a display will be described.

Figure 12A:
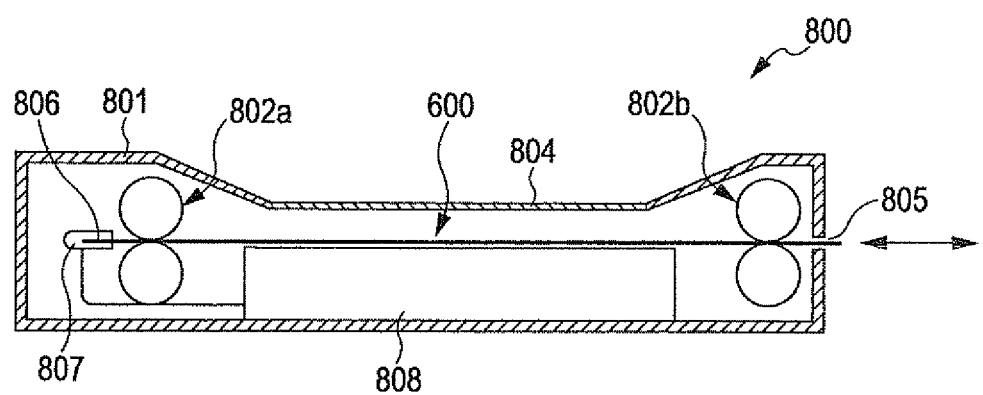
FIG. 12A and FIG. 12B are views illustrating an embodiment when an electronic apparatus of the invention is applied to a display.
Figure 12B:
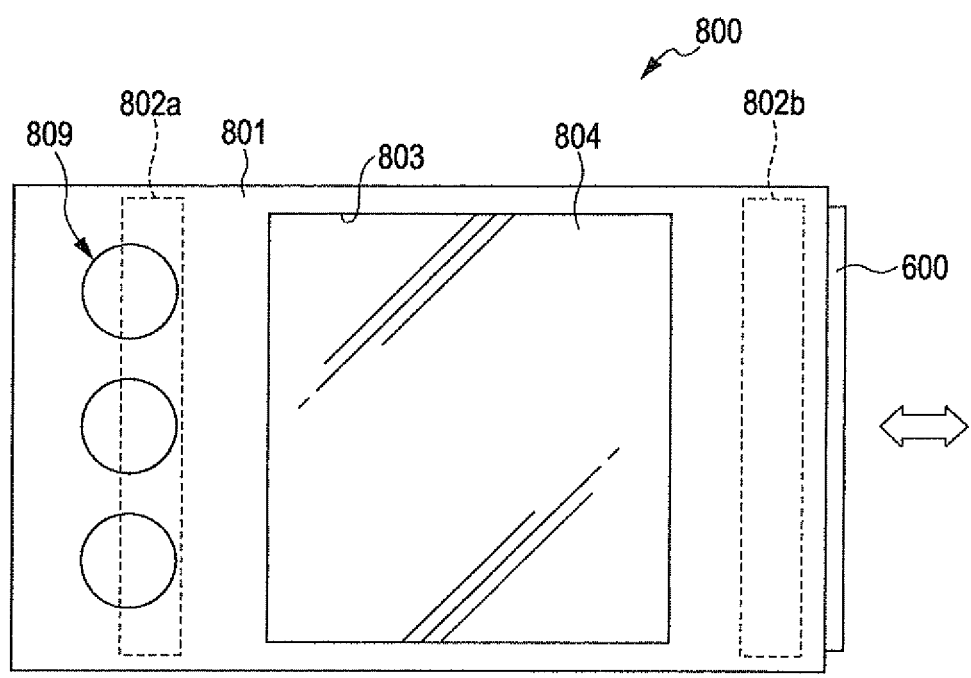

FIG. 12A and FIG. 12B are views illustrating the embodiment in which the electronic apparatus of the invention is applied to the display. FIG. 12A is a cross-sectional view, and FIG. 12B is a plan view.

The display (display device) 800 shown in FIG. 12A and FIG. 12B includes a main body unit 801, and an electronic paper 600 provided to be attachable to and detachable from the main body unit 801. The electronic paper 600 has the same configuration as the above description, that is, the configuration shown in FIG. 11.

The main body unit 801 is provided with an insertion opening 805, to which the electronic paper 600 can be inserted, on the side portion (the right side in FIG. 12A), and is provided therein with two sets of transport rollers 802a and 802b. When the electronic paper 600 is inserted into the main body unit 801 through the insertion opening 805, the electronic paper 600 is mounted on the main body unit 801 in a state where the electronic paper is pinched by the transport rollers 802a and 802b.

A rectangular hollow portion 803 is formed on the display face side (the front side of the paper face in FIG. 12B) of the main body unit 801, and a transparent glass plate 804 is fitted to the hollow portion 803. Accordingly, it is possible to visually recognize the electronic paper 600 provided in the main body unit 801 from the outside of the main body unit 801. That is, in the display 800, the display face of the electronic paper 600 provided in the main body unit 801 is configured to be visible on the transparent glass plate 804.

A terminal portion 806 is provided at the leading portion (the left side in FIG. 12A) of the insertion direction of the electronic paper 600, and the main body unit 801 is provided therein with a socket 807 connected to the terminal portion 806 in a state where the electronic paper 600 is mounted on the main body unit 801. The socket 807 is electrically connected to a controller 808 and an operation unit 809.

In such a display 800, the electronic paper 600 is provided to be attachable to and detachable from the main body unit 801, and may be portably carried in a state where it is detached from the main body unit 801. Accordingly, convenience is improved.

The display sheet, the display device, and the electronic apparatus of the invention have been described above on the basis of the shown embodiments, but the invention is not limited thereto, and the configuration of each unit may be replaced by an arbitrary configuration having the same function. The other configuration may be added to the invention. The embodiments may be appropriately combined.

In the embodiments described above, the white particles A and the black particle B are charged particles which are charged with reverse polarities, but the invention is not limited thereto. For example, one side of the white particles A and the black particles B may have positively or negatively charged particles, and the other side may have uncharged particles which are not substantially charged.

In this case, parameters related to the average particle diameter of predetermined particles, such as the average pore diameter of the unwoven bodies 611 and 621, the separation distance between the first particle constrained layer 61 and the substrate 12 described in the second embodiment, or the separation distance between the third particle constrained layer 63 and the opposed substrate 11 described in the third embodiment may be parameters described above in relation with the average particle diameter of the charged particles between the white particles A and the black particles B. This is because the uncharged particles keep the state in which the particles are dispersed in the dispersion medium, irrespective of the existence of electric field or the posture of the display device.

The average particle diameter of the uncharged particles is preferably larger than the average particle diameter of the charged particles. Accordingly, it is possible to raise the constraint property of the uncharged particles by the particle constrained layer 6, and thus it is possible to more reliably keep the state where the uncharged particles are uniformly dispersed.

In this case, it is preferable that the black particles are the charged particles and the white particles are the uncharged particles. In this case, when the black particles are collected on the first electrode side, it becomes the white display state, and when the black particles are collected on the second electrode side, becomes the black display state. In addition, it is possible to more efficiently reflect and diffuse light from the display face 121 by dispersing the white particles, and thus it is possible to display white with higher reflectance.

In the embodiments described above, the average particle diameters of the white particles and the black particles are the same as each other, but the invention is not limited thereto, and the average particle diameters may be different from each other. In this case, parameters related to the average particle diameter of predetermined particles, such as the average pore diameter of the unwoven bodies 611 and 621, the separation distance between the first particle constrained layer 61 and the substrate 12 described in the second embodiment, or the separation distance between the third particle constrained layer 63 and the opposed substrate 11 described in the third embodiment may be parameters described above in relation with the particles with the large average particle diameter between the white particles A and the black particles B.

In the embodiments described above, the first particle constrained layer and the second particle constrained layer are separately formed, but the invention is not limited thereto, and they may be integrally formed. When the first particle constrained layer and the second particle constrained layer are integrally formed, a boundary between the first particle constrained layer and the second particle constrained layer is clearly determined such that the void ratios are different with respect to the boundary. In addition, the boundary is not provided, and the void ratio may be gradually decreased from the second particle constrained layer to the first particle constrained layer. That is, if there is a gradient in which the void ratio of the particle constrained layer on the display face side is decreased, any configuration may be employed. The same is applied to the third particle constrained layer.

At least one of the other particle constrained layers may be provided between the first particle constrained layer and the second particle constrained layer. When the other particle constrained layer is one layer, the void ratio of the constrained layer may be lower than that of the first particle constrained layer and higher than that of the second particle constrained layer. When the other particle constrained layer is a plurality of layers, the void ratios of all the layers may be lower than that of the first particle constrained layer and higher than that of the second particle constrained layer, and the void ratios may be increased from the second particle constrained layer to the first particle constrained layer.

The entire disclosure of Japanese Patent Application No. 2010-242242, filed Oct. 28, 2010 is expressly incorporated by reference herein.

What is claimed is:

1. A display sheet comprising:
a first substrate that is provided on a display face side;
a second substrate that is provided opposing the first substrate;
a display layer that is provided between the first substrate and the second substrate, and is filled with a dispersion liquid in which at least one kind of positively or negatively charged particles are dispersed in a dispersion medium; and
a particle constrained layer that is provided in the display layer,
wherein a void ratio of the first substrate side of the particle constrained layer is higher than that of the second substrate side, on the first substrate side.

2. The display sheet according to claim 1, wherein the particle constrained layer has a first particle constrained layer provided on the first substrate side and a second particle constrained layer provided closer to the second substrate side than the first particle constrained layer, and wherein the void ratio of the first particle constrained layer is higher than that of the second particle constrained layer.

3. A display sheet comprising:
a first substrate that is provided on a display face side;
a second substrate that is provided opposing the first substrate;
a display layer that is provided between the first substrate and the second substrate, and is filled with a dispersion liquid in which at least one kind of positively or negatively charged particles are dispersed in a dispersion medium; and
a particle constrained layer that is provided in the display layer,
wherein the particle constrained layer has a first particle constrained layer provided on the first substrate side and a second particle constrained layer provided closer to the second substrate side than the first particle constrained layer, and
wherein the void ratio of the first particle constrained layer is higher than that of the second particle constrained layer.

4. The display sheet according to claim 2, wherein the particle constrained layer allows the particles to move in a thickness direction of the display layer and prevents the particles from moving in an in-plain direction of the display layer.

5. The display sheet according to claim 2, wherein the void ratio of the first particle constrained layer is equal to or more than 70% and equal to or less than 99%, and
wherein the void ratio of the second particle constrained layer is equal to or more than 50% and equal to or less than 90%.

6. The display sheet according to claim 2, wherein a value of H1/H2 is equal to or more than 0.1 and equal to less than 0.5 where a thickness of the first particle constrained layer is H1 and a thickness of the second particle constrained layer is H2.

7. The display sheet according to claim 2, wherein the first particle constrained layer is separated from the first substrate, and the separation distance between the first particle constrained layer and the first substrate is equal to or more than 0.5 times and equal to or less than 5 times an average particle diameter of the particles.

8. The display sheet according to claim 2, wherein the particle constrained layer further includes a third particle constrained layer that is provided closer to the second substrate side than the second particle constrained layer, and a void ratio of the third particle constrained layer is higher than that of the second particle constrained layer.

9. The display sheet according to claim 8, wherein the void ratio of the third particle constrained layer is equal to or more than 70% and equal to or less than 99%.

10. The display sheet according to claim 1, wherein the particle constrained layer has at least one of a porous body and an aggregate of fibers.

11. The display sheet according to claim 1, wherein the dispersion liquid includes positively or negatively charged first particles, and second particles charged having polarity reverse to that of the first particles, and
wherein average particle diameters of the first particles and the second particles are substantially the same.

12. A display device comprising the display sheet according to claim 1.

13. An electronic apparatus comprising the display device according to claim 1.

* * * * *